United States Patent
Uchiyama

(10) Patent No.: US 10,232,536 B2
(45) Date of Patent: Mar. 19, 2019

(54) MOLDING MONITORING APPARATUS

(71) Applicant: FANUC Corporation, Yamanashi (JP)

(72) Inventor: Tatsuhiro Uchiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 83 days.

(21) Appl. No.: 15/377,081

(22) Filed: Dec. 13, 2016

(65) Prior Publication Data
US 2017/0173835 A1  Jun. 22, 2017

(30) Foreign Application Priority Data

Dec. 21, 2015  (JP) .................................. 2015-249044
Aug. 29, 2016  (JP) .................................. 2016-166635

(51) Int. Cl.
 *B29C 45/76* (2006.01)
 *G05B 19/418* (2006.01)

(52) U.S. Cl.
 CPC ...... *B29C 45/768* (2013.01); *G05B 19/41875* (2013.01); *B29C 2045/7606* (2013.01); *B29C 2945/76163* (2013.01); *G05B 2219/32177* (2013.01); *G05B 2219/45244* (2013.01)

(58) Field of Classification Search
 CPC .. B29C 2045/7606; B29C 2945/76163; B29C 45/768; G05B 19/41875; G05B 2219/32177; G05B 2219/45244
 See application file for complete search history.

(56) References Cited

U.S. PATENT DOCUMENTS

| | | | | |
|---|---|---|---|---|
| 6,651,510 B2 * | 11/2003 | Noma | ..................... | B29C 33/70 73/856 |
| 7,521,695 B2 * | 4/2009 | Nakada | .................. | H01J 37/265 250/310 |
| 8,638,930 B2 * | 1/2014 | Saito | ......................... | G06F 7/58 380/46 |
| 9,056,957 B2 * | 6/2015 | Seidel | ....................... | C08J 3/226 |
| 9,978,133 B2 * | 5/2018 | Wakebe | ................. | G06T 7/0004 |

(Continued)

FOREIGN PATENT DOCUMENTS

| | | | |
|---|---|---|---|
| JP | H03231824 A | 10/1991 | |
| JP | 7-290542 A | 11/1995 | |

(Continued)

OTHER PUBLICATIONS

Office Action in JP Application No. 2016-166635, dated Nov. 28, 2017, 8 pp.

*Primary Examiner* — Abdelmoniem I Elamin
(74) *Attorney, Agent, or Firm* — Hauptman Ham, LLP

(57) ABSTRACT

A molding monitoring apparatus acquires an image of a molding molded by an injection molding machine, determines whether abnormality is present in the molding, and specifies an abnormality occurrence position thereof when the abnormality is present. Further, the molding monitoring apparatus calculates the number of abnormality occurrences for each abnormality occurrence position, and compares, among the calculated number of abnormality occurrences for each abnormality occurrence position, the number of abnormality occurrences for each abnormality occurrence position in a certain term with the number of abnormality occurrences for each abnormality occurrence position in another term.

12 Claims, 5 Drawing Sheets

ABNORMALITY OCCURRENCE POSITION (X DIRECTION)

| ABNORMALITY OCCURRENCE POSITION (Y DIRECTION) | 1 | 2 | 3 | 4 | 5 | 6 | 7 | 8 | 9 | 10 |
|---|---|---|---|---|---|---|---|---|---|---|
| 1 | 3 | 4 | 3 | 1 | | | 0 | 0 | 0 | 0 |
| 2 | 3 | 4 | 3 | 1 | | | 0 | 0 | 0 | 0 |
| 3 | 2 | 2 | 2 | 1 | | | 0 | 0 | 0 | 0 |
| 4 | 2 | 1 | 2 | 1 | | | 0 | 1 | 0 | 0 |
| 5 | 3 | 0 | 1 | 1 | 1 | 1 | 1 | 1 | 0 | 0 |
| 6 | 2 | 0 | 1 | 1 | 1 | 2 | 2 | 2 | 0 | 0 |
| 7 | 1 | 0 | 0 | 1 | | | 3 | 3 | 0 | 0 |
| 8 | 1 | 0 | 0 | 0 | | | 3 | 2 | 0 | 0 |
| 9 | 0 | 0 | 0 | 0 | | | 2 | 2 | 0 | 0 |
| 10 | 0 | 0 | 0 | 0 | | | 1 | 1 | 0 | 0 |

(56) References Cited

U.S. PATENT DOCUMENTS

| | | | | |
|---|---|---|---|---|
| 2003/0089179 | A1* | 5/2003 | Noma | B29C 33/70 73/856 |
| 2007/0194234 | A1* | 8/2007 | Nakada | H01J 37/265 250/310 |
| 2013/0018137 | A1* | 1/2013 | Seidel | C08J 3/226 524/317 |
| 2013/0302457 | A1* | 11/2013 | Zahoransky | B29C 45/10 425/104 |
| 2015/0125068 | A1* | 5/2015 | Iwanaga | G06T 7/0004 382/149 |
| 2016/0110032 | A1* | 4/2016 | Okochi | B22D 17/32 425/162 |
| 2016/0167266 | A1* | 6/2016 | Wakebe | B29C 45/7626 382/141 |
| 2016/0263799 | A1* | 9/2016 | Shiraishi | B29C 45/1753 |

FOREIGN PATENT DOCUMENTS

| | | | |
|---|---|---|---|
| JP | 2006297759 | A | 11/2006 |
| JP | 2007160642 | A | 6/2007 |
| JP | 2009061786 | A | 3/2009 |
| JP | 2013-86358 | A | 5/2013 |
| JP | 2013-188775 | A | 9/2013 |
| JP | 2014069382 | A | 4/2014 |

* cited by examiner

MOLDING

ABNORMALITY OCCURRENCE POSITION (X DIRECTION)

ABNORMALITY OCCURRENCE POSITION (Y DIRECTION)

|    | 1 | 2 | 3 | 4 | 5 | 6 | 7 | 8 | 9 | 10 |
|----|---|---|---|---|---|---|---|---|---|----|
| 1  | 3 | 4 | 3 | 1 |   |   | 0 | 0 | 0 | 0  |
| 2  | 3 | 4 | 3 | 1 |   |   | 0 | 0 | 0 | 0  |
| 3  | 2 | 2 | 2 | 1 |   |   | 0 | 0 | 0 | 0  |
| 4  | 2 | 1 | 2 | 1 |   |   | 0 | 1 | 0 | 0  |
| 5  | 3 | 0 | 1 | 1 | 1 | 1 | 1 | 1 | 0 | 0  |
| 6  | 2 | 0 | 1 | 1 | 1 | 2 | 2 | 2 | 0 | 0  |
| 7  | 1 | 0 | 0 | 1 |   |   | 3 | 3 | 0 | 0  |
| 8  | 1 | 0 | 0 | 0 |   |   | 3 | 2 | 0 | 0  |
| 9  | 0 | 0 | 0 | 0 |   |   | 2 | 2 | 0 | 0  |
| 10 | 0 | 0 | 0 | 0 |   |   | 1 | 1 | 0 | 0  |

ABNORMALITY OCCURRENCE POSITION (X DIRECTION)

| ABNORMALITY OCCURRENCE POSITION (Y DIRECTION) | 1 | 2 | 3 | 4 | 5 | 6 | 7 | 8 | 9 | 10 |
|---|---|---|---|---|---|---|---|---|---|---|
| 1 | 30% | 40% | 30% | 10% | | | 0% | 0% | 0% | 0% |
| 2 | 30% | 40% | 30% | 10% | | | 0% | 0% | 0% | 0% |
| 3 | 20% | 20% | 20% | 10% | | | 0% | 0% | 0% | 0% |
| 4 | 20% | 10% | 20% | 10% | | | 0% | 10% | 0% | 0% |
| 5 | 30% | 0% | 10% | 10% | 10% | 10% | 10% | 10% | 0% | 0% |
| 6 | 20% | 0% | 10% | 10% | 10% | 20% | 20% | 20% | 0% | 0% |
| 7 | 10% | 0% | 0% | 10% | | | 30% | 30% | 0% | 0% |
| 8 | 10% | 0% | 0% | 0% | | | 30% | 20% | 0% | 0% |
| 9 | 0% | 0% | 0% | 0% | | | 20% | 20% | 0% | 0% |
| 10 | 0% | 0% | 0% | 0% | | | 10% | 10% | 0% | 0% |

FIG. 7

| NUMBER OF SHOTS | PEAK PRESSURE (Mpa) P(n) | MINIMUM CUSHION AMOUNT (mm) C(n) | METERING TIME (SECOND) M(n) | IMAGE (1,1) | IMAGE (1,2) | ... | IMAGE (2,1) | IMAGE (2,2) | ... | IMAGE (10,10) |
|---|---|---|---|---|---|---|---|---|---|---|
| 1 | P(1) | C(1) | M(1) | OK | NG | ... | OK | OK | ... | NG |
| 2 | P(2) | C(2) | M(2) | OK | OK | ... | OK | OK | ... | OK |
| 3 | P(3) | C(3) | M(3) | OK | NG | ... | OK | OK | ... | NG |
| 4 | P(4) | C(4) | M(4) | NG | NG | ... | OK | OK | ... | OK |
| ... | ... | ... | ... | ... | ... | ... | ... | ... | ... | ... |
| N-1 | P(N-1) | C(N-1) | M(N-1) | NG | NG | ... | OK | OK | ... | OK |
| N | P(N) | C(N) | M(N) | OK | NG | ... | OK | OK | ... | OK |

MOLDING MONITORING APPARATUS

RELATED APPLICATIONS

The present application claims priority to Japanese Patent Application Number 2015-249044, filed Dec. 21, 2015, and Japanese Patent Application Number 2016-166635, filed Aug. 29, 2016, the disclosures of which are hereby incorporated by reference herein in its entirety.

BACKGROUND OF THE INVENTION

1. Field of the Invention

The present invention relates to a monitoring apparatus for moldings molded by an injection molding machine, and particularly relates to a molding monitoring apparatus that allows a tendency for generation of molding defects to be grasped by acquiring images of a plurality of moldings.

2. Description of the Related Art

When a defect is generated in a molding molded by an injection molding machine, specifying a generation position of the defect is extremely important in taking a measure against the defect. For example, when a burr or a short shot is generated at an end of the molding, there is a possibility that a pressure in packing process is inappropriate. When silver is generated around a gate of the molding, there is a possibility that an injection speed is inappropriate. In addition, when carbide is randomly viewed on a surface of the molding, there is a possibility that a resin temperature is inappropriate.

Recently, various means have been proposed to acquire an image of a molding, and detect the above-described defect such as the burr, the short shot, the silver, the carbide, etc. based on the image. For example, JP 2009-061786 A discloses a die monitoring apparatus that acquires an image of a molding, and operates a molding machine or an attachment device according to a position at which abnormality occurs. Japanese Patent Application Laid-Open No. 3-231824 discloses an injection molding machine monitoring apparatus that acquires an image of a molding using a video camera, and determines the presence/absence of abnormality using brightness of a mesh-patterned detection unit region. Japanese Patent Application Laid-Open No. 2007-160642 discloses a molding machine management system that compares an image of a non-defective product with an image of a defective product, and stores difference data thereof. Japanese Patent Application Laid-Open No. 2006-297759 discloses a nonconforming item generation prevention molding system that specifies a type or a degree of a defect based on a captured image of a molding, and corrects a molding condition.

In the above-described conventional arts, identifying a tendency for generation of defects based on defect generation statuses in a plurality of moldings is effective to determine whether the above-described defect such as the burr, the short shot, the silver, the carbide, etc. is accidental or results from the above-described molding condition such as the pressure, the injection speed, the resin temperature, etc.

However, all the above-described technologies disclosed in those patent documents described above determine quality of each molding rather than grasping a tendency for generation of defects.

Meanwhile, Japanese Patent Application Laid-Open No. 2014-69382 discloses a defect-cause determination system capable of totalizing the number of instances of defect generation for each defect generation place to indicate the number in a graph, and comparing process values of an injection molding machine among a plurality of shots including a shot at which a defect is generated. However, this conventional art cannot compare defect generation places among a plurality of shots having different molding conditions, and thus has difficulty in specifying a molding condition corresponding to a cause of a molding defect.

As described above, even though all the above-described conventional arts contribute to a measure against an accidental molding defect, these conventional arts have difficulty in establishing an optimal molding condition and embodying long-term stable molding.

SUMMARY OF THE INVENTION

The invention has been conceived to solve the above-mentioned problem, and an object of the invention is to provide a molding monitoring apparatus that allows a difference in tendency for generation of a molding defect between different terms to be grasped by acquiring images of a plurality of moldings in the different terms.

The molding monitoring apparatus according to the invention includes a molding image acquisition unit for acquiring an image of a molding molded by an injection molding machine, and an abnormality occurrence position specifying unit for determining whether abnormality is present in the molding based on the image and specifying an abnormality occurrence position when the abnormality is present. The molding image acquisition unit acquires images of at least two moldings, and the abnormality occurrence position specifying unit calculates, for each abnormality occurrence position, the number of abnormality occurrences and/or an abnormality occurrence frequency. The molding monitoring apparatus further includes a comparison unit for comparing, among the calculated number of abnormality occurrences and/or abnormality occurrence frequency for each abnormality occurrence position, the numbers of abnormality occurrences and/or abnormality occurrence frequencies for each abnormality occurrence position in a plurality of different terms.

The abnormality occurrence position specifying unit may be configured to control a display unit to display a numerical value indicating the number of abnormality occurrences or the abnormality occurrence frequency for each abnormality occurrence position on a plane representing the abnormality occurrence position in each of the different terms.

The abnormality occurrence position specifying unit may be configured to control a display unit to display a three-dimensional (3D) graph in a space including a plane representing the abnormality occurrence position and an axis representing the number of abnormality occurrences or the abnormality occurrence frequency for each abnormality occurrence position in each of the different terms.

The comparison unit may be configured to obtain a difference between the numbers of abnormality occurrences or the abnormality occurrence frequencies in the different terms for each abnormality occurrence position, and control a display unit to display a numerical value indicating the difference on a plane representing the abnormality occurrence position.

The comparison unit may be configured to obtain a difference between the numbers of abnormality occurrences or the abnormality occurrence frequencies in the different terms for each abnormality occurrence position, and control a display unit to display a 3D graph in a space including a plane representing the abnormality occurrence position and an axis representing the difference.

The different terms may be terms in which molding operations of predetermined number of molding cycles are performed or predetermined times.

The molding monitoring apparatus may further include physical quantity acquisition unit for acquiring a physical quantity of the injection molding machine for each molding cycle, and the abnormality occurrence position specifying unit may be configured to associate the physical quantity with the abnormality occurrence position, and store the physical quantity and the abnormality occurrence position in a memory unit.

The molding monitoring apparatus may further include a physical quantity acquisition unit for acquiring a physical quantity of the molding for each molding cycle, and the abnormality occurrence position specifying unit may be configured to associate the physical quantity with the abnormality occurrence position, and store the physical quantity and the abnormality occurrence position in a memory unit.

The abnormality occurrence position specifying unit may be configured to control the display unit to display the numbers of abnormality occurrences and/or abnormality occurrence frequencies for each abnormality occurrence position calculated in a case where the physical quantity is within a predetermined range and in a case where it is out of the predetermined range, when the physical quantity is within the predetermined range and when it is out of the predetermined range.

The abnormality occurrence position specifying unit may be configured to store a reference molding image serving as a criterion for distinguishing abnormality of a molding in advance, and determine whether abnormality is present in the molding by comparing the image with the reference molding image.

The reference molding image may be acquired by the molding image acquisition unit in advance.

According to the invention, it is possible to provide a molding monitoring apparatus that allows a difference in tendency for generation of a molding defect between different terms to be grasped by acquiring images of a plurality of moldings in the different terms.

BRIEF DESCRIPTION OF THE DRAWINGS

The forgoing and other objects and feature of the invention will be apparent from the following description of preferred embodiments of the invention with reference to the accompanying drawings, in which:

FIG. 7 is a diagram illustrating an example of data (an example of association between a physical quantity and an abnormality occurrence position) stored in a memory unit by a molding monitoring apparatus according to another embodiment of the invention (including a physical quantity acquisition unit).

DETAILED DESCRIPTION OF THE PREFERRED EMBODIMENTS

First, a description will be given of a configuration of a molding monitoring apparatus according to a first embodiment of the invention using FIG. 1.

Figure 1:
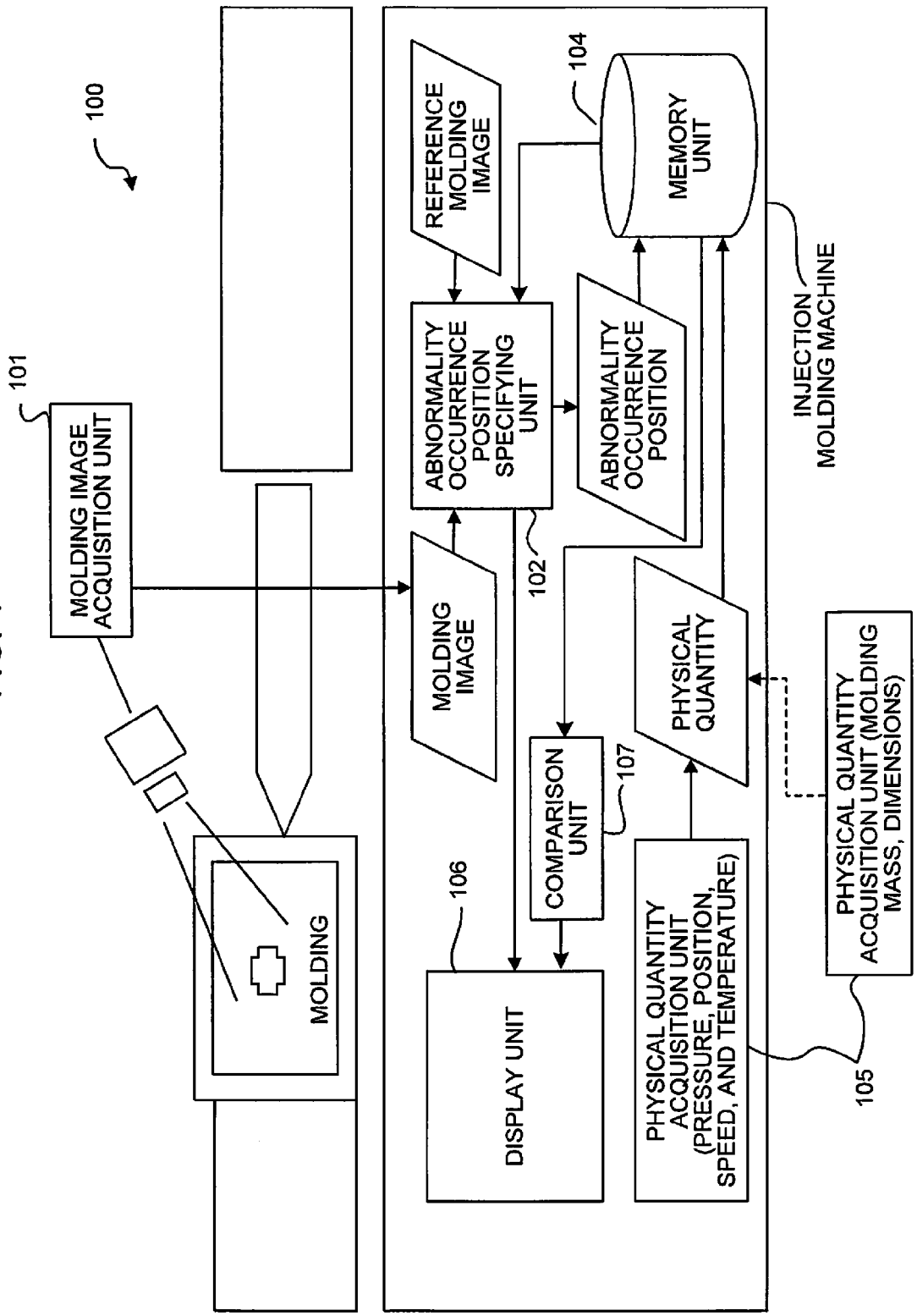
FIG. 1 is a block diagram illustrating a configuration of a molding monitoring apparatus according to an embodiment of the invention.

A molding monitoring apparatus 100 of the present embodiment may be incorporated in an injection molding machine as illustrated in FIG. 1, and may be a separate apparatus from the injection molding machine. A typical molding monitoring apparatus 100 logically implements various functional means when a central processing unit (CPU) performs a predetermined process according to a program stored in a memory device, and controls a variety of hardware as necessary.

The molding monitoring apparatus 100 includes a molding image acquisition unit 101, an abnormality occurrence position specifying unit 102, a memory unit 104, a display unit 106, and a comparison unit 107.

The molding image acquisition unit 101 is a unit that acquires an image of a molding molded by the injection molding machine, and a camera unit can be typically used.

The abnormality occurrence position specifying unit 102 performs a process of determining whether abnormality is present in the molding image acquired by the molding image acquisition unit 101, and further performs a process of specifying a position at which abnormality occurs when abnormality is determined to be present in the acquired molding image. Specifically, the abnormality occurrence position specifying unit 102 acquires a non-defective molding image corresponding to a reference image (a reference molding image) in advance, and determines whether abnormality is present by comparing the reference molding image with the molding image acquired by the molding image acquisition unit 101. Alternatively, a CAD drawing of the molding may be used as a reference image in place of the reference molding image.

Figures 2, 3:
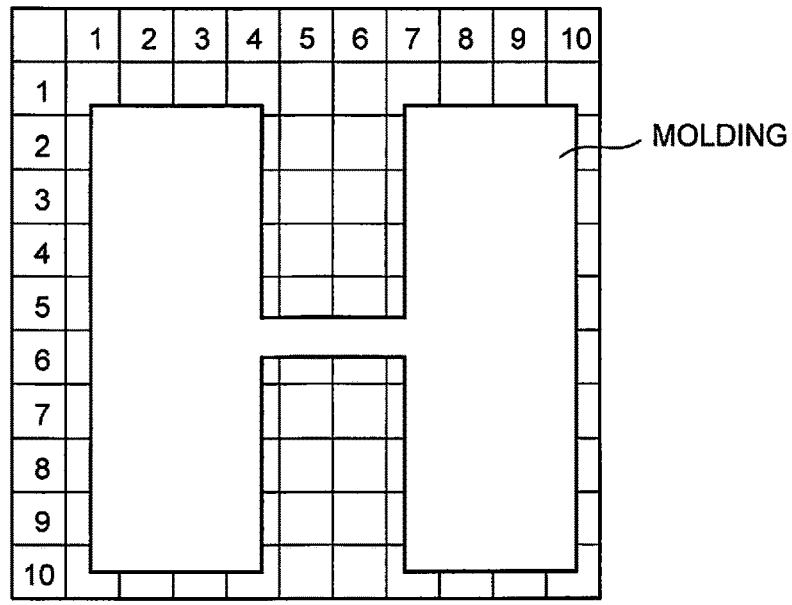
FIG. 2 is a diagram illustrating an example of a scheme of specifying a position, at which abnormality occurs, of a molding image acquired by a molding image acquisition unit in the molding monitoring apparatus of FIG. 1.
FIG. 3 is a diagram illustrating a first display example of the number of abnormality occurrences or abnormality occurrence frequency displayed on a display unit by an abnormality occurrence position specifying unit in the molding monitoring apparatus of FIG. 1.

FIG. 2 illustrates an example of a scheme of specifying a position, at which abnormality occurs, of the molding image acquired by the molding image acquisition unit 101.

The abnormality occurrence position specifying unit 102 disposes an image obtained by capturing a predetermined surface of the molding on an XY coordinate plane. Then, the coordinate plane is divided into regions having arbitrary sizes in a lattice shape, and the above-described determination process is performed for each region. As a result, a region in which abnormality is determined to be present is specified as a position at which abnormality occurs.

In addition, the abnormality occurrence position specifying unit 102 acquires molding images of at least two similar moldings using the molding image acquisition unit 101.

Then, at least one of the number of abnormality occurrences or abnormality occurrence frequency of the molding is calculated for each position at which abnormality occurs, and a calculation result thereof is displayed on the display unit 106.

Figures 4, 5:
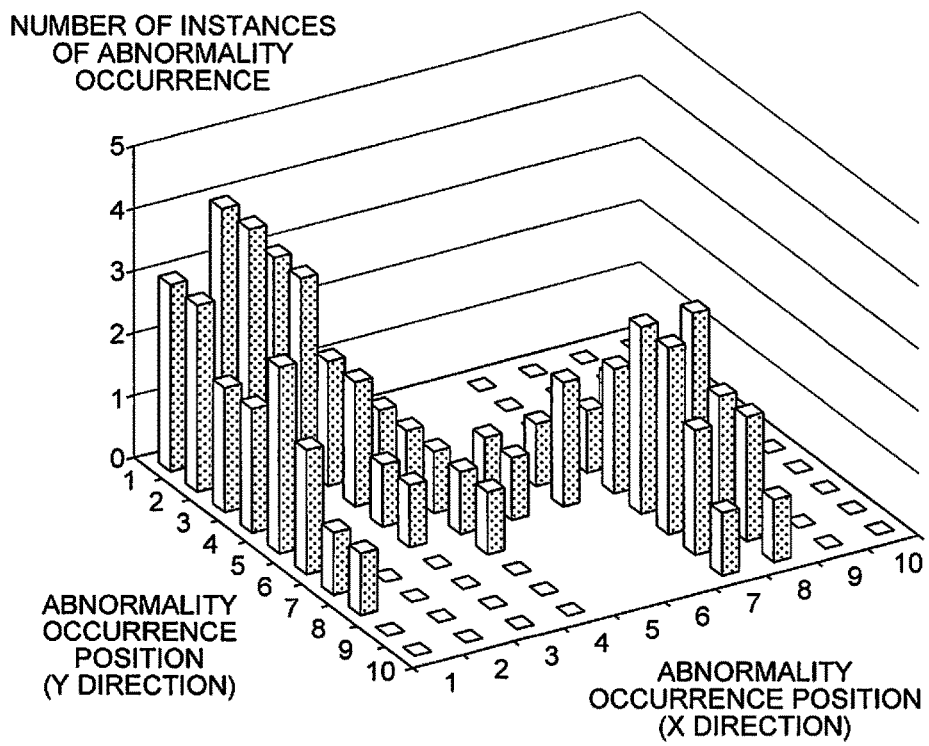
FIG. 4 is a diagram illustrating a second display example of the number of abnormality occurrences or the abnormality occurrence frequency displayed on the display unit by the abnormality occurrence position specifying unit in the molding monitoring apparatus of FIG. 1.
FIG. 5 is a diagram illustrating a third display example of the number of abnormality occurrences or the abnormality occurrence frequency displayed on the display unit by the abnormality occurrence position specifying unit in the molding monitoring apparatus of FIG. 1.

FIG. 3 to FIG. 5 illustrate some display examples of the number of abnormality occurrences or abnormality occurrence frequency displayed on the display unit 106 by the abnormality occurrence position specifying unit 102 in the molding monitoring apparatus 100.

A chart of FIG. 3 is an example of displaying a numerical value indicating the number of abnormality occurrences on regions having a lattice shape indicating abnormality occurrence positions. For example, if a numerical value "4" is displayed in a certain region, it indicates that the number of abnormality occurrence is four in the corresponding position.

A chart of FIG. 4 is an example of displaying a numerical value indicating abnormality occurrence frequency on regions having a lattice shape similarly to that illustrated in FIG. 3. For example, if a numerical value "40%" is displayed in a certain region, it indicates that 40% of molding images acquired by the abnormality occurrence position specifying unit 102 have abnormality occurring in the corresponding position.

A graph of FIG. 5 is an example of creating and displaying a three-dimensional (3D) graph in a coordinate space including a third axis, which indicates the number of abnormality occurrences or abnormality occurrence frequency, in addition to XY axes included in a plane which contains regions having a lattice shape. According to the example of FIG. 5, a position at which the number of abnormality occurrences or abnormality occurrence frequency is great may be more instinctively grasped.

The abnormality occurrence position specifying unit 102 may specify an abnormality occurrence position each time a molding image is acquired, and update the number of abnormality occurrences and abnormality occurrence frequency in the abnormality occurrence position in each case. Alternatively, the abnormality occurrence position specifying unit 102 may store an abnormality occurrence position each time a molding image is acquired, and then collectively calculate the number of abnormality occurrences and abnormality occurrence frequency for each abnormality occurrence position. The abnormality occurrence position specifying unit 102 stores the number of abnormality occurrences and the abnormality occurrence frequency calculated for each abnormality occurrence position in the memory unit 104.

The comparison unit 107 performs a process of comparing pieces of information related to the numbers of abnormality occurrences or abnormality occurrence frequencies calculated under different molding conditions. In other words, the comparison unit 107 performs a process of comparing the numbers of abnormality occurrences or abnormality occurrence frequencies for each abnormality occurrence position calculated in different terms with each other. In this way, an influence of a change in a molding condition is easily verified.

Hereinafter, a description will be given of an operation example of the molding monitoring apparatus 100 according to the present embodiment. First, the injection molding machine performs molding for first 100 shots. Then, the abnormality occurrence position specifying unit 102 calculates the number of abnormality occurrences or abnormality occurrence frequency for each abnormality occurrence position with respective to moldings for the 100 shots, and stores a calculation result thereof in the memory unit 104.

The injection molding machine further performs molding for subsequent 100 shots by changing a packing condition. Then, the abnormality occurrence position specifying unit 102 calculates the number of abnormality occurrences or abnormality occurrence frequency for each abnormality occurrence position with respective to moldings corresponding to the 100 shots, and stores a calculation result thereof in the memory unit 104.

Figure 6:
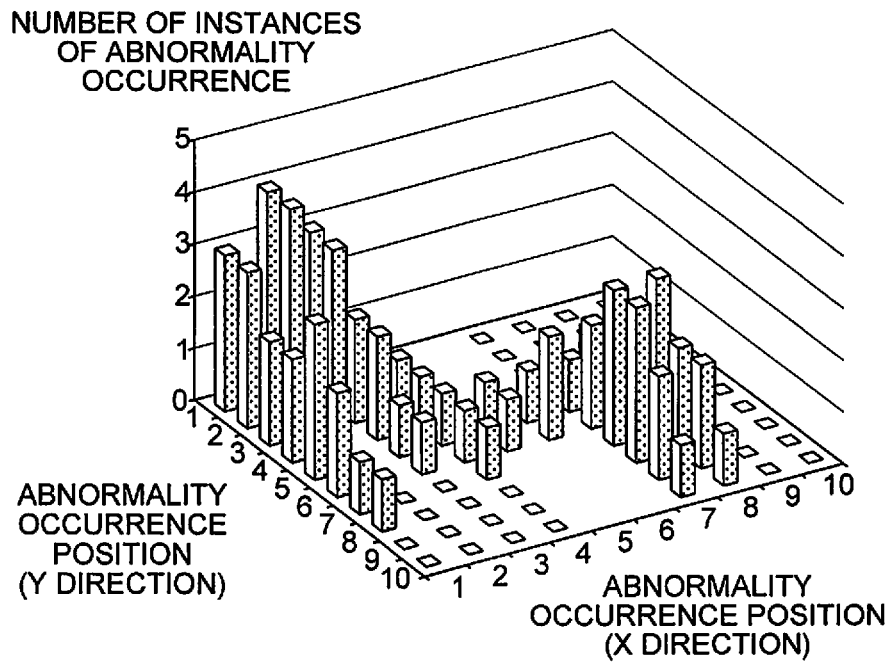
FIG. 6 is a diagram illustrating an example of displaying a graph that represents the number of abnormality occurrences corresponding to first 100 shots and a graph that represents the number of abnormality occurrences corresponding to subsequent 100 shots side by side for comparison on a display unit in the molding monitoring apparatus of FIG. 1.
Figure 6:
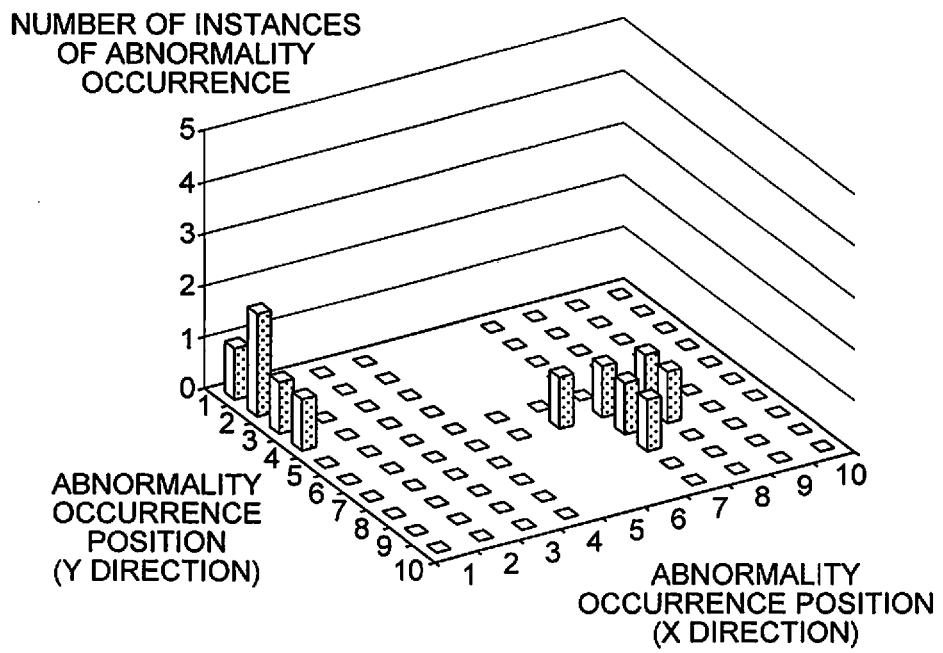

The comparison unit 107 reads information related to the numbers of abnormality occurrences or abnormality occurrence frequencies in a plurality of different terms from the memory unit 104. In this example, the comparison unit 107 reads the number of abnormality occurrences or the abnormality occurrence frequency for the first 100 shots, and the number of abnormality occurrences or the abnormality occurrence frequency for the subsequent 100 shots, respectively. Then, as illustrated in FIG. 6, the comparison unit 107 displays, on the display unit 106, a chart or a graph indicating the number of abnormality occurrences or the abnormality occurrence frequency corresponding to the first 100 shots, and the number of abnormality occurrences or the abnormality occurrence frequency for the subsequent 100 shots side by side. In this way, a user can identify a change in a defect occurrence state due to a change in a molding condition, etc. For example, the change in the packing condition can be evaluated to be appropriate when the number of abnormality occurrences or the abnormality occurrence frequency decreases in the subsequent 100 shots when compared to the first 100 shots. Further, instead of displaying two charts or two graphs side by side, the comparison unit 107 may obtain a difference between the number of abnormality occurrences or the abnormality occurrence frequency for the first 100 shots and the number of abnormality occurrences or the abnormality occurrence frequency for the subsequent 100 shots for each abnormality occurrence position, and display the difference in a form such as the chart of FIG. 3 or FIG. 4 or the graph of FIG. 5.

This embodiment is not restricted to the above-described example. For example, the comparison unit 107 may display the number of abnormality occurrences or abnormality occurrence frequency obtained by performing molding for first one hour, and the number of abnormality occurrences or abnormality occurrence frequency obtained by performing molding for subsequent one hour side by side. That is, the comparison unit 107 compares the numbers of abnormality occurrences or abnormality occurrence frequencies in a plurality of arbitrarily defined different terms.

The molding monitoring apparatus 100 according to this embodiment can grasp a tendency for generation of a molding defect by statistically processing abnormality occurrence positions of a plurality of moldings. Specifically, the number of abnormality occurrences or abnormality occurrence frequency may be calculated for each abnormality occurrence position. In this way, for example, when the number of abnormality occurrences or abnormality occurrence frequency at an end position of a molding is high, the user can estimate that this defect phenomenon is not accidental, and a packing condition potentially has a problem. Further, the molding monitoring apparatus 100 displays pieces of information related to the numbers of abnormality occurrences or abnormality occurrence frequencies calculated under different molding conditions, etc. side by side. In this way, the user can easily verify an influence of a change in a molding condition, etc.

Next, a description will be given of a configuration of a molding monitoring apparatus according to a second embodiment of the invention.

A molding monitoring apparatus 100 of the present embodiment corresponds to an apparatus obtained by adding a physical quantity acquisition unit 105 to the molding monitoring apparatus 100 according to the first embodiment (as illustrated in FIG. 1), and is characterized in that physical quantities (for example, a peak injection pressure, a minimum cushion amount, metering time, a molding weight, molding dimensions, etc.) detected by the injection molding machine are acquired using the physical quantity acquisition unit 105, and the acquired physical quantities are stored together with an abnormality occurrence position of a molding.

Hereinafter, a description will be given of an operation example of the molding monitoring apparatus 100 of this embodiment.

The physical quantity acquisition unit 105 acquires physical quantities (for example, a peak injection pressure, a minimum cushion amount, metering time, an injection speed, a resin temperature, etc.) when a molding is molded from the injection molding machine. Alternatively, the above physical quantities may be acquired for every predetermined molding cycle number. Further, physical quantities related to a molding (for example, a molding weight, molding dimensions, etc.) may be acquired from a tester (not illustrated).

The abnormality occurrence position specifying unit 102 stores an abnormality occurrence position of a molding and a physical quantity acquired by the physical quantity acquisition unit 105, as a set, in the memory unit 104.

FIG. 7 illustrates an example of data stored in the memory unit by the molding monitoring apparatus 100 of this embodiment.

Herein, "a peak pressure", "a minimum cushion amount", and "metering time", which are physical quantities, and "image (1, 1)" to "image (10, 10)" indicating the presence/absence of an abnormality occurrence (OK=no abnormality, NG=abnormality present) for each of regions in a lattice shape are associated with each other and stored.

According to this embodiment, a relation between a physical quantity of the injection molding machine and an abnormality occurrence position is made clear, and thus a measure against a molding defect can be further facilitated. Specifically, a molding cycle at which a predetermined physical quantity exceeds a predetermined range and a molding cycle within the predetermined range are extracted from sets of molding abnormality positions and physical quantities stored in the memory unit 104, the number of abnormality occurrences or abnormality occurrence frequency is calculated for each abnormality occurrence position, and a calculation result is stored. In addition, if the molding monitoring apparatus 100 displays a chart or a graph indicating the number of abnormality occurrences or abnormality occurrence frequency of the molding cycle at which the predetermined physical quantity exceeds the predetermined range, and a chart or a graph indicating the number of abnormality occurrences or abnormality occurrence frequency of the molding cycle within the predetermined range side by side, then how an abnormality occurrence position varies depending on whether the physical quantity is within the predetermined range or not can be easily grasped.

The invention is not restricted to the above-described embodiments, and modifications such as replacement, omission, and addition of a component, switching of order, etc. may be made within the scope not departing from a subject matter.

The invention claimed is:

1. A molding monitoring apparatus, comprising:
   a molding image acquisition unit for acquiring an image of a molding molded by an injection molding machine; and
   an abnormality occurrence position specifying unit for determining whether abnormality is present in the molding based on the image, and specifying an abnormality occurrence position when the abnormality is present,
   wherein the molding image acquisition unit acquires images of at least two moldings,
   wherein the abnormality occurrence position specifying unit calculates, for each abnormality occurrence position, the number of abnormality occurrences and/or an abnormality occurrence frequency from the images of the at least two moldings acquired by the molding image acquisition unit,
   wherein the molding monitoring apparatus further comprises
   a comparison unit for comparing, among the calculated number of abnormality occurrences and/or abnormality occurrence frequency for each abnormality occurrence position, the numbers of abnormality occurrences and/or abnormality occurrence frequencies for each abnormality occurrence position in a plurality of different terms, and
   wherein the abnormality occurrence position specifying unit is configured to control a display unit to display a result of the comparing by the comparison unit to indicate a tendency for generation of a molding defect.

2. The molding monitoring apparatus according to claim 1, wherein the abnormality occurrence position specifying unit is configured to control the display unit to display a numerical value indicating the number of abnormality occurrences or the abnormality occurrence frequency for each abnormality occurrence position on a plane representing the abnormality occurrence position in each of the plurality of different terms.

3. The molding monitoring apparatus according to claim 1, wherein the abnormality occurrence position specifying unit is configured to control the display unit to display a three-dimensional (3D) graph in a space including a plane representing the abnormality occurrence position and an axis representing the number of abnormality occurrences or the abnormality occurrence frequency for each abnormality occurrence position in each of the plurality of different terms.

4. The molding monitoring apparatus according to claim 1, wherein the comparison unit is configured to obtain a difference between the numbers of abnormality occurrences or the abnormality occurrence frequencies in the plurality of different terms for each abnormality occurrence position, and control the display unit to display a numerical value indicating the difference on a plane representing the abnormality occurrence position.

5. The molding monitoring apparatus according to claim 1, wherein the comparison unit is configured to obtain a difference between the numbers of abnormality occurrences or the abnormality occurrence frequencies in the plurality of different terms for each abnormality occurrence position, and control the display unit to display a 3D graph in a space including a plane representing the abnormality occurrence position and an axis representing the difference.

6. The molding monitoring apparatus according to claim 1, wherein the plurality of different terms are terms in which molding operations of a predetermined number of molding cycles are performed or predetermined times.

7. A molding monitoring apparatus, comprising:
a molding image acquisition unit for acquiring an image of a molding molded by an injection molding machine; and
an abnormality occurrence position specifying unit for determining whether abnormality is present in the molding based on the image, and specifying an abnormality occurrence position when the abnormality is present,
wherein the molding image acquisition unit acquires images of at least two moldings,
wherein the abnormality occurrence position specifying unit calculates, for each abnormality occurrence position, the number of abnormality occurrences and/or an abnormality occurrence frequency,
wherein the molding monitoring apparatus further comprises:
a comparison unit for comparing, among the calculated number of abnormality occurrences and/or abnormality occurrence frequency for each abnormality occurrence position, the numbers of abnormality occurrences and/or abnormality occurrence frequencies for each abnormality occurrence position in a plurality of different terms, and
a physical quantity acquisition unit for acquiring a physical quantity of the injection molding machine for each molding cycle,
wherein the abnormality occurrence position specifying unit is configured to associate the physical quantity with the abnormality occurrence position, and store the physical quantity and the abnormality occurrence position in a memory unit, and
wherein the abnormality occurrence position specifying unit is configured to control a display unit to display a result of the comparing by the comparison unit to indicate a tendency for generation of a molding defect.

8. A molding monitoring apparatus, comprising:
a molding image acquisition unit for acquiring an image of a molding molded by an injection molding machine; and
an abnormality occurrence position specifying unit for determining whether abnormality is present in the molding based on the image, and specifying an abnormality occurrence position when the abnormality is present,
wherein the molding image acquisition unit acquires images of at least two moldings,
wherein the abnormality occurrence position specifying unit calculates, for each abnormality occurrence position, the number of abnormality occurrences and/or an abnormality occurrence frequency,
wherein the molding monitoring apparatus further comprises:
a comparison unit for comparing, among the calculated number of abnormality occurrences and/or abnormality occurrence frequency for each abnormality occurrence position, the numbers of abnormality occurrences and/or abnormality occurrence frequencies for each abnormality occurrence position in a plurality of different terms, and
a physical quantity acquisition unit for acquiring a physical quantity of the molding for each molding cycle,
wherein the abnormality occurrence position specifying unit is configured to associate the physical quantity with the abnormality occurrence position, and store the physical quantity and the abnormality occurrence position in a memory unit, and
wherein the abnormality occurrence position specifying unit is configured to control a display unit to display a result of the comparing by the comparison unit to indicate a tendency for generation of a molding defect.

9. The molding monitoring apparatus according to claim 7, wherein the abnormality occurrence position specifying unit is configured to control the display unit to display the numbers of abnormality occurrences and/or abnormality occurrence frequencies for each abnormality occurrence position calculated in a case where the physical quantity is within a predetermined range and in a case where the physical quantity is out of the predetermined range, when the physical quantity is within the predetermined range and when the physical quantity is out of the predetermined range.

10. The molding monitoring apparatus according to claim 1, wherein the abnormality occurrence position specifying unit is configured to store a reference molding image serving as a criterion for distinguishing abnormality of a molding in advance, and determine whether abnormality is present in the molding by comparing the image of the molding with the reference molding image.

11. The molding monitoring apparatus according to claim 10, wherein the reference molding image is acquired by the molding image acquisition unit in advance.

12. The molding monitoring apparatus according to claim 8, wherein the abnormality occurrence position specifying unit is configured to control the display unit to display the numbers of abnormality occurrences and/or abnormality occurrence frequencies for each abnormality occurrence position calculated in a case where the physical quantity is within a predetermined range and in a case where the physical quantity is out of the predetermined range, when the physical quantity is within the predetermined range and when the physical quantity is out of the predetermined range.

* * * * *